United States Patent
Lu et al.

(10) Patent No.: US 7,532,773 B2
(45) Date of Patent: May 12, 2009

(54) DIRECTIONAL INTERPOLATION METHOD AND DEVICE FOR INCREASING RESOLUTION OF AN IMAGE

(75) Inventors: Zhi-Ming Lu, Sikou Township, Chiayi County (TW); Kun-Wei Lin, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 700 days.

(21) Appl. No.: 10/870,968

(22) Filed: Jun. 21, 2004

(65) Prior Publication Data

US 2005/0074186 A1    Apr. 7, 2005

(30) Foreign Application Priority Data

Oct. 6, 2003    (TW) ............... 92127657 A

(51) Int. Cl.
G06K 9/32    (2006.01)
G06K 9/36    (2006.01)

(52) U.S. Cl. .................. 382/300; 382/276; 382/299
(58) Field of Classification Search ............ 382/262, 382/300, 299, 251, 263, 458, 273
See application file for complete search history.

(56) References Cited

U.S. PATENT DOCUMENTS 6,133,957 A * 10/2000 Campbell ............... 348/458
6,181,802 B1 * 1/2001 Todd ..................... 382/100
6,760,489 B1 * 7/2004 Kuwata .................. 382/300
7,043,091 B2 * 5/2006 Michel ................... 382/266
7,057,653 B1 * 6/2006 Kubo ..................... 348/273
7,084,905 B1 * 8/2006 Nayar et al. ............. 348/222.1
7,167,602 B2 * 1/2007 Yamashita et al. ........ 382/300
2002/0150166 A1 * 10/2002 Johnson ................. 375/240.29

* cited by examiner

Primary Examiner—Jingge Wu
Assistant Examiner—Amara Abdi
(74) Attorney, Agent, or Firm—Bacon & Thomas, PLLC

(57) ABSTRACT

A directional interpolation method and device for increasing resolution of an image is disclosed. The device includes an input terminal, a memory, a texture analysis module, a texture variance consistence module and an interpolation module. The input terminal receives signals representing the pixels of the image. The memory stores the pixels in row direction. The texture analysis module obtains a monotone variation area by taking the position as a center. The texture variance consistence module computes all directional texture variances in a closest upper and a closest lower rows of pixels within the monotone variation area in the case of taking the position as a center and accordingly finds two pixels having texture variance consistence. The interpolation module finds a value of pixel to be interpolated to the position through a median filter in accordance with the two pixels and their neighbor pixels.

11 Claims, 4 Drawing Sheets

○ ○ ○ ○ ○ ○ ○ ○ ○ ○ ○
p015 p014 p013 p012 p011 p000 p001 p002 p003 p004 p005

× × × × × × × × × × ×
p115 p114 p113 p112 p111 p100 p101 p102 p103 p104 p105 row2 ○ ○ ○ ○ ○ ○ ○ ○ ○ ○ ○
p215 p214 p213 p212 p211 p200 p201 p202 p203 p204 p205

× × × × × × × × × × ×
p315 p314 p313 p312 p311 p300 p301 p302 p303 p304 p305 row4 ○ ○ ○ ○ ○ ○ ○ ○ ○ ○ ○
p415 p414 p413 p412 p411 p400 p401 p402 p403 p404 p405

× × × × × × × × × × ×
p515 p514 p513 p512 p511 p500 p501 p502 p503 p504 p505

○ ○ ○ ○ ○ ○ ○ ○ ○ ○ ○
p615 p614 p613 p612 p611 p600 p601 p602 p603 p604 p605

```
if (abs(m) < low_th )        out = 0;
else if(abs(m)  > high_th)   out = 2;
else if (m > 0 )             out = 1;
else if (m < 0 )             out = -1;
else                         out = 0;
```

DIRECTIONAL INTERPOLATION METHOD AND DEVICE FOR INCREASING RESOLUTION OF AN IMAGE

BACKGROUND OF THE INVENTION

1. Field of the Invention

The present invention relates to the technical field of image processing and, more particularly, to a directional interpolation method for increasing resolution of an image.

2. Description of Related Art

Upon current TV broadcasting technology, odd and even display fields are alternately broadcasted due to limited bandwidth. Such a broadcasting method may lose even or odd lines of an image in every display field at the vertical direction, and thus a typical TV only displays odd or even lines of the image in scanning and displaying. However, new generation display systems such as liquid crystal displays (LCDs) have higher vertical resolution and thus obtain required high-resolution TV images by interpolation in vertical direction.

U.S. Pat. No. 5,001,563 granted to Doyle, et al. for a "Method of and circuit for processing a picture signal" discloses a method for processing a picture signal to interpolate a pixel by filtering the adjacent pixels. It focuses on the filter design, which only refers to the image pixels adjacent to the pixel to be interpolated. However, when it is applied to an image pixel with smoother gradient or thin slashes, the interpolated images may cause decision mistakes due to insufficient image messages, and accordingly the image with thin slashes is shown in zigzag and blur.

To overcome the aforementioned problem, U.S. Pat. No. 6,133,957 granted to Campbell; Jack J. for an "Adaptive diagonal interpolation for image resolution enhancement" discloses a method for using a least texture variance method to find one with the least texture variance from images to be interpolated as an interpolated image source, thereby increasing search distance. However, when the reference image distance is increased, a probability of image decision mistake is relatively increased and thus an unnatural image is generated. To avoid decision mistake problem, a confidence determination mechanism is added, which gives magnitude of confidence based on texture variance complexity of an image. When a low confidence is given, vertical direction is used as the interpolated image source, thereby avoiding decision mistake. However, such a way mostly uses vertical interpolation for a complicated image and thus the image shows discontinuousness.

Therefore, it is desirable to provide an improved interpolation method to mitigate and/or obviate the aforementioned problems.

SUMMARY OF THE INVENTION

The object of the present invention is to provide a directional interpolation method and device for increasing resolution of an image, which can avoid the prior decision mistake, blur and discontinuousness of an image.

In accordance with one aspect of the present invention, there is provided a directional interpolation method for increasing resolution of an image. The image consists of pixels arranged in rows and columns. The directional interpolation method adds a plurality of pixels to increase resolution of the image. Any of the pixels added is located on a position in the image. The directional interpolation method includes a texture analysis step, a texture variance consistence step and an interpolation step. The texture analysis step obtains a monotone variation area by taking the position as a center. The monotone variation area is a union of same-sized regions where pixels of an upper monotone variation area faces to pixels of a lower monotone variation area one-to-one. The upper monotone variation area is obtained by performing both a high-pass filtering on pixels centered in a closest upper row to the position and a region determination process on the pixels after being high-pass filtered. The lower monotone variation area is obtained by performing both a high-pass filtering on pixels centered in a closest lower row to the position and a region determination process on the pixels after being high-pass filtered. The texture variance consistence step computes all directional texture variances in the closest upper and the closest lower rows of pixels within the monotone variation area in the case of taking the position as a center and accordingly finds two pixels having texture variance consistence. The interpolation step finds a value of pixel to be interpolated to the position by filtering in accordance with the two pixels found at the texture variance consistence step.

In accordance with another aspect of the present invention, there is provided a directional interpolation device for increasing resolution of an image. The image consists of pixels arranged in rows and columns. The directional interpolation device adds a plurality of pixels to increase resolution of the image. Any of the pixels added is located on a position in the image. The directional interpolation device includes an input terminal, a memory, a texture analysis module, a texture variance consistence module and an interpolation module. The input terminal receives signals representing the pixels of the image. The memory is connected to the input terminal in order to store the pixels of the image in row direction. The texture analysis module is connected to the memory in order to obtain a monotone variation area by taking the position as a center. The monotone variation area is a union of same-sized regions where pixels of an upper monotone variation area face pixels of a lower monotone variation area one-to-one. The upper monotone variation area is obtained by performing both a high-pass filtering on pixels centered in a closest upper row to the position and a region determination process on the pixels after being high-pass filtered. The lower monotone variation area is obtained by performing both a high-pass filtering on pixels centered in a closest lower row to the position and a region determination process on the pixels after being high-pass filtered. The texture variance consistence module is connected to the texture analysis module in order to compute all directional texture variances in the closest upper and the closest lower rows of pixels within the monotone variation area in the case of taking the position as a center and accordingly finds two pixels having texture variance consistence. The interpolation module is connected to the texture variance consistence module in order to find a value of pixel to be interpolated to the position through a median filter in accordance with the two pixels and their neighbor pixels.

Other objects, advantages, and novel features of the invention will become more apparent from the following detailed description when taken in conjunction with the accompanying drawings.

DETAILED DESCRIPTION OF THE PREFERRED EMBODIMENT

Figures 1, 2:
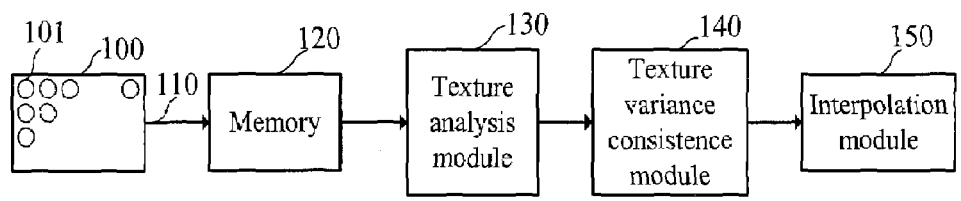
FIG. 1 is a block diagram of a directional interpolation device for increasing resolution of an image in accordance with the invention.
FIG. 2 is a schematic diagram of partial image in process in accordance with an embodiment of the invention.

FIG. 1 is a block diagram of a directional interpolation device for increasing resolution of an image in accordance with the invention. As shown, the image 100 processed consists of pixels 101 arranged in rows and columns. The device adds a plurality of pixels to increase resolution of the image. Any of the pixels added is located on a position in the image 100. The device includes an input terminal 110, a memory 120, a texture analysis module 130, a texture variance consistence module 140 and an interpolation module 150.

As shown in FIG. 1, the input terminal 110 receives signals representing the pixels 101 of the image 100. The memory 120 is connected to the input terminal 110 in order to store the pixels 101 of the image 100 in row direction. FIG. 2 shows partial pixels 101 of the image 100. As shown, circles represent original pixels of the image 100 and Xs represent pixels interpolated in the image 100. In this case, pixel p300 is given as an example to following operation and description. The pixel p300 can represent brightness or gray-scale value of the pixel. The pixel p300 can also represents a difference level of composite color for an RGB image.

The texture analysis module 130 is connected to the memory 120 in order to obtain a monotone variation area by taking the position as a center. The monotone variation area is a union of same-sized regions where pixels of an upper monotone variation area face pixels of a lower monotone variation area one-to-one. The upper monotone variation area is obtained by performing both a high-pass filtering on pixels centered in a closest upper row to the position and a region determination process on the pixels after high-pass filtered. The lower monotone variation area is obtained by performing both a high-pass filtering on pixels centered in a closest lower row to the position and a region determination process on the pixels after high-pass filtered.

The texture variance consistence module 140 is connected to the texture analysis module 130 in order to compute all directional texture variances in the closest upper and the closest lower rows of pixels within the monotone variation area in the case of taking the position as a center and accordingly finds two pixels having texture variance consistence.

The interpolation module 150 is connected to the texture variance consistence module 140 in order to find a value of pixel to be interpolated to the position through a median filter in accordance with the two pixels and their neighbor pixels.

Figures 3, 4:
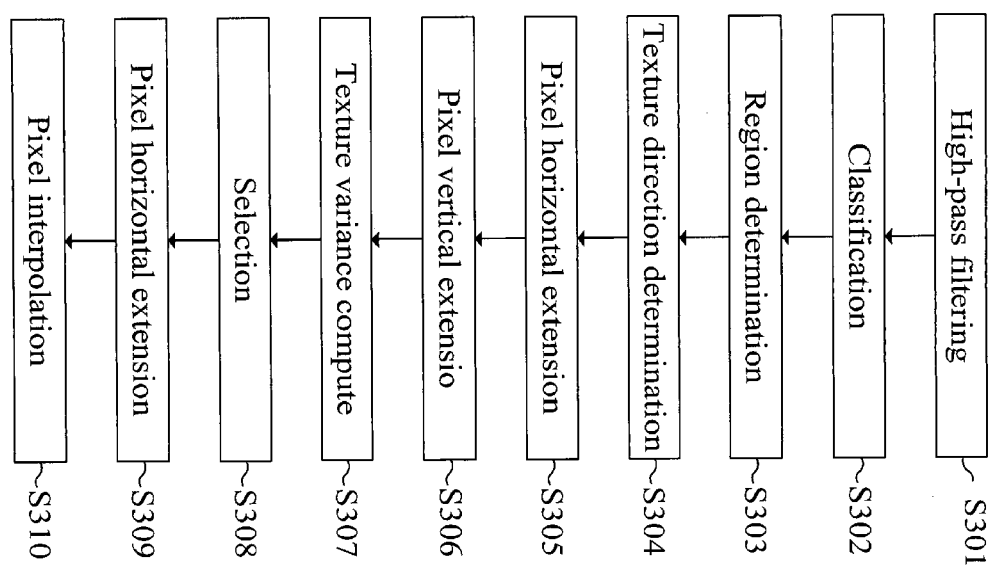
FIG. 3 is a flowchart of a directional interpolation method for increasing resolution of an image in accordance with the invention.
FIG. 4 is a diagram of hardware descriptive language program codes of a hardware classifier in accordance with the invention.

FIG. 3 is a flowchart of the present invention. First, in step S301, it performs a high-pass filtering process on pixels centered in a closest upper row (row2) to an inserting position of the pixels p300. The high-pass filtering performs an inner product on a pixel and its neighbor pixels with a high-pass matrix, to thus obtain a scalar. The high-pass matrix is a 2×6 matrix with [−1 −1 −2 2 1 1; −1 −1 −2 2 1 1]. For example, a high-pass filtering for pixel p200 performs an inner product on [p012 p011 p000 p001 p002 p003; p212 p211 p200 p201 p202 p203] with [−1 −1 −2 2 1 1; −1 −1 −2 2 1 1], to thus obtain a scalar.

The lower monotone variation area performs high-pass filtering on pixels centered in a closest lower row (row4) to the inserting position of the pixels p300. The high-pass filtering performs an inner product on a pixel and its neighbor pixels with the high-pass matrix of [−1 −1 −2 2 1 1; −1 −1 −2 2 1 1], to thus obtain a scalar. For example, a high-pass filtering for pixel p400 performs an inner product of [p412 p411 p400 p401 p402 p403; p612 p611 p600 p601 p602 p603] with [−1 −1 −2 2 1 1; −1 −1 −2 2 1 1], to thus obtain a scalar.

High-pass filtering is applied to each pixel in the closest upper row (row2) to the inserting position of the pixel p300, thereby representing brightness change rate m of pixels in the row (row2). Similarly, High-pass filtering is applied to each pixel in the closest lower row (row4) to the inserting position of the pixel p300, thereby representing brightness change rate m of pixels in the row (row4).

In step S302, it performs a classification step, which classifies the scalars into flat, bumpiness, mono left slope and mono right slope respectively representative of 0, 2, 1 and −1 in accordance with the brightness change rate m. The classification can be performed by a hardware classifier. The hardware classifier can carry out the classification by pseudo codes of FIG. 4 implemented in Verilog or VHDL hardware descriptive language, where low_th and high_th are two settings that can be set by a user, thereby enhancing flexibility of the invention.

Figure 5:
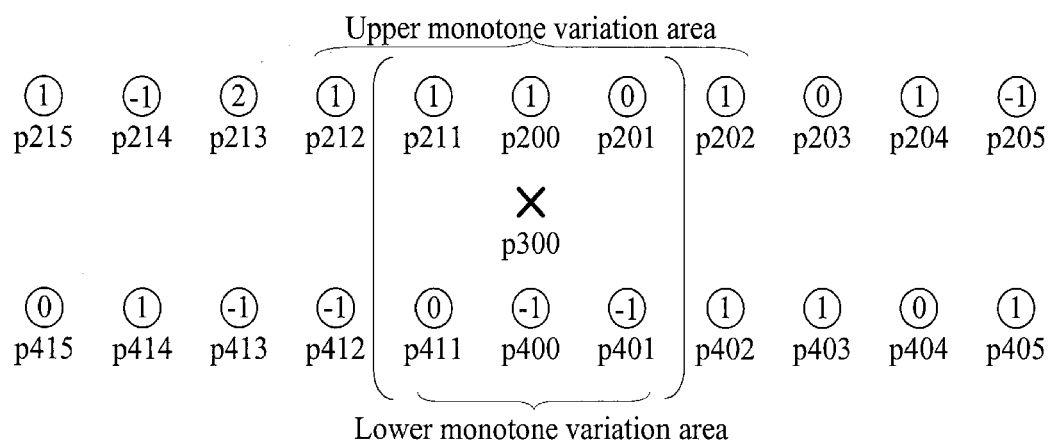
FIG. 5 is a schematic diagram of a monotone variation area in accordance with the invention.

After classification of the brightness change rate m of row2, a sequence of 0, 2, 1, −1 representative of the brightness change rate of row2 is obtained, as shown in FIG. 5. Similarly, after classification of the brightness change rate m of row4, a sequence of 0, 2, 1, −1 representative of the brightness change rate of row4 is obtained.

Accordingly, in step S303, it performs a region determination process, in which the pixel p200 in the row closet to and right above the insertion position of the pixel p300 is taking as a center to search toward left and right directions to find intervals with values of {0, 1}, {0, −1}, {1}, {0} or {−1}. In this case, upon centering the pixel p200, when a distance of 0 indicates to the pixel p200 having an interval of {1}, it means that the pixel p200 is of monotone variation area; when a distance of 1 indicates to pixels p200, p211, p201 having intervals of {1, 1, 0} or {1, 0}, it means that the pixels p200, p211, p201 are of monotone variation area; when a distance of 2 indicates to pixels p200, p212, p211, p201, p202 having intervals of {1, 1, 1, 0, 1} or {1, 0}, it means that the pixels p200, p212, p211, p201, p202 are of monotone variation area; and when a distance of 3 indicates to pixels p200, p213, p212, p211, p201, p202, p203 having intervals of {2, 1, 1, 1, 0, 1, 0} or {2, 1, 0}, it means that the pixels p200, p213, p212, p211, p201, p202, p203 do not meet with defined monotone variation area. Thus, the pixels p200, p212, p211, p201 and p202 form an upper monotone variation area.

Similarly, in step S303, region determination also finds intervals with values of {0, 1}, {0, −1}, {1}, {0} or {−1} from left and right intervals by taking the pixel p400, in the closest lower row and directly below the inserting position of the pixel p300, as a center. In this case, upon centering the pixel p400, a lower monotone variation area with p400, p411 and p401 is obtained. Accordingly, the monotone variation area with p200, p211, p201, p400, p411, p401 can be obtained by getting a union of same-sized regions where pixels of the upper monotone variation area faces to pixels of the lower monotone variation area one-to-one.

Figure 6:
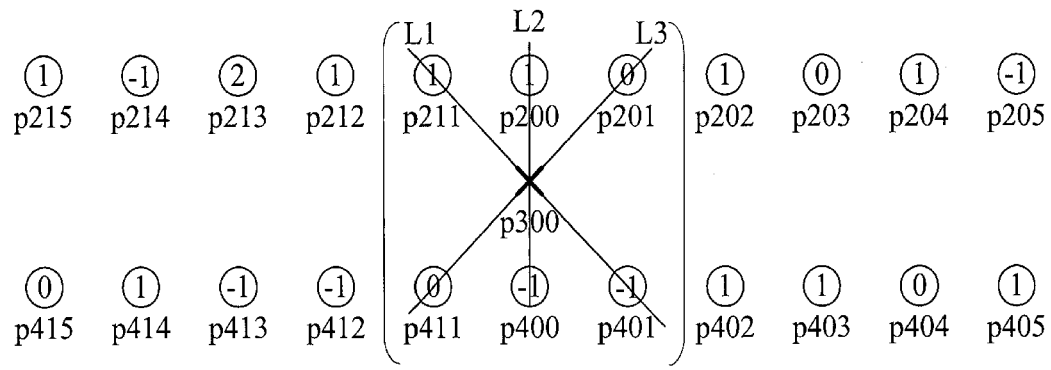
FIG. 6 is a schematic diagram of a texture direction in accordance with the invention.

Step S304 performs a texture direction determination step, which forms pixels p200, p211, p201, p400, p411 and p401 in the monotone variation area as three lines respectively including the pixel p300. Each line passes through and centers the inserting position of the pixel p300. Each line direction forms a texture direction, such that a plurality of pixels in the monotone variation area forms a plurality of texture direction. As shown in FIG. 6, the pixels p211 and p401 form a line L1 passing through and centering on the inserting position of the pixel p300. Similarly, lines L2 and L3 are formed and regarded as texture directions.

Figure 7:
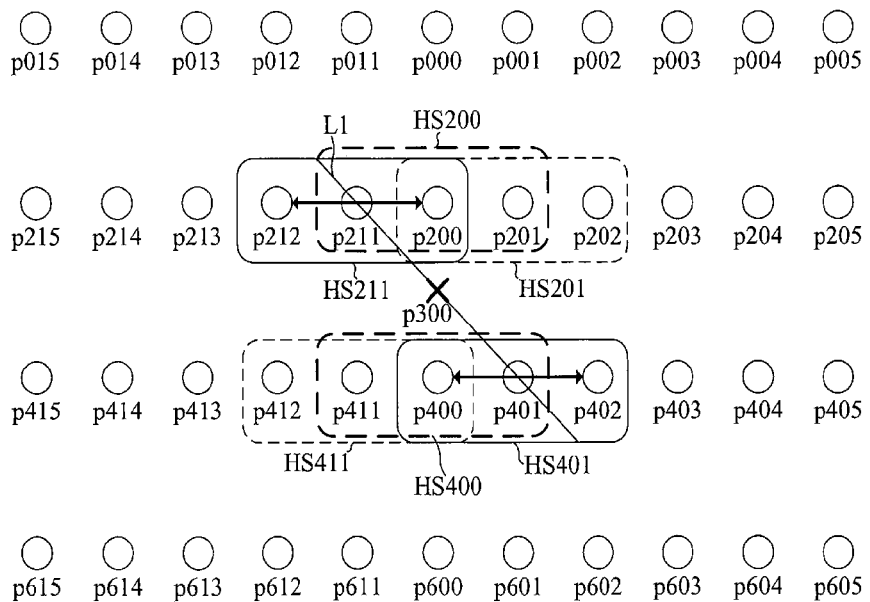
FIG. 7 is a schematic diagram of a pixel horizontal extension process in accordance with the invention.

In step S305, it performs a pixel horizontal extension process, which extends a pixel in the monotone variation area to its left and right pixels at the same row to thus form a set. For example, as shown in FIG. 7, pixels p211, p212, p200 form a set HS211 and pixels p401, p400, p402 form a set HS401. The two sets HS211 and HS401 are a pair along the texture direction L1. Similarly, the pixel horizontal extension is applied to pixels p200, p201, p400 and p401 in the monotone variation area to thus form a pair of HS200, HS201 along the texture direction L2 and a pair of HS400, HS401 along the texture direction L3, respectively.

Figure 8:
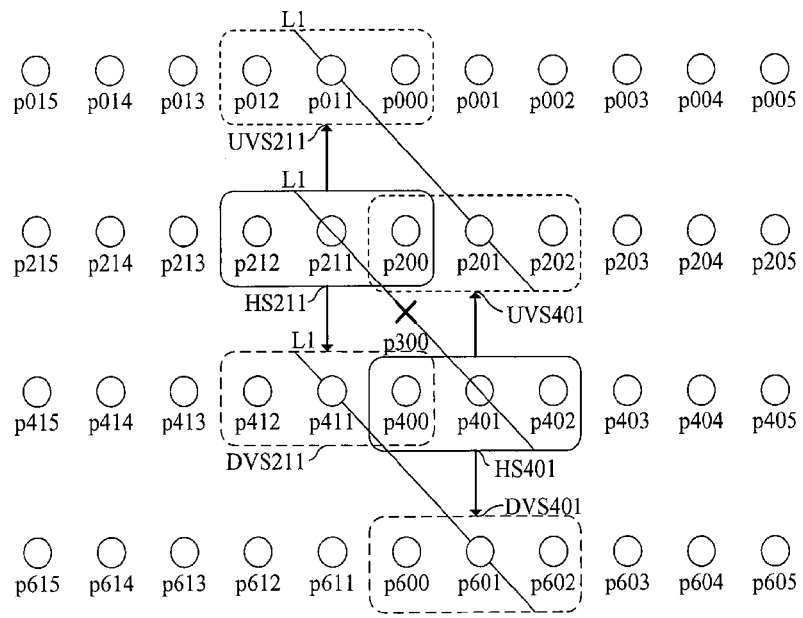
FIG. 8 is a schematic diagram of a pixel vertical extension process in accordance with the invention.

In step S306, it performs a pixel vertical extension process, which upwardly shifts a pair generated at step S305 one row to thus obtain a different pair and downwardly shifts the pair one row to thus obtain another different pair. For example, as shown in FIG. 8, a pair of HS211, HS401 is upwardly shifted one row to thus obtain a pair of UVS211, UVS401 and also downwardly shifted one row to thus obtain a pair of DVS211, DVS401. Similarly, the pixel vertical extension is applied to HS200, HS201, HS400 and HS401 (not shown).

In step S307, it performs a texture variance compute process, which computes texture variances along the texture directions. A texture variance of the texture direction L1 is computed by the following equation:

$$d_{p211\_p401} = abs\{A*[a*(p012-p200)+b*(p011-p201)+c*(p000-p202)]+B*[a*(p212-p400)+b*(p211-p401)+c*(p200-p402)]+C*[a*(p412-p600)+b*(p411-p601)+c*(p400-p602)]\}. \quad (1)$$

Similarly, a texture variance $d_{p200\_p400}$ along the texture direction L2 and a texture variance $d_{p201\_p411}$ along the texture direction L3 can be derived from equation (1), where coefficients A, B, C, a, b and c are adjusted with processing image to thus increase the flexibility.

In step S308, it performs a selection process, which selects two pixels with the least texture variance that is derived at step S307.

In step S309, it performs a pixel horizontal extension process, which separately combines each of corresponding two pixels found at step S308 with its left pixel and right pixel at the same row, so as to form two sets of pixels. For example, if pixels p211 and p401 with the least texture variance are found at step S308, pixels p211, p212, p200 form a set HS211 and pixels p401, p400, p402 form another set HS401.

In step S310, it performs a pixel interpolation compute process, which applies filtering to the two sets obtained at step S309 for median filtering computation to obtain a value of pixel to be interpolated to the inserting position of the pixel p300. Namely, $$p300=[\text{filter}(p212+p211+p200)+\text{filter}(p400+p401+p402)]/2, \quad (2)$$

where the filter can be a median filter.

As aforementioned, the invention uses long distance image message as a determination base to enhance resolution of interpolated image. Also, texture slope relation can be used to find effective region for interpolation. Since texture slope relation has consistent in a same object in the image, effective region of the interpolated value in accordance with the present invention is also limited in the same texture slope relation. Furthermore, pixels with consistent texture change in the effective region are a source of the interpolated image. Thus, unnatural and discontinuous image caused by decision mistake can be reduced.

Although the present invention has been explained in relation to its preferred embodiment, it is to be understood that many other possible modifications and variations can be made without departing from the spirit and scope of the invention as hereinafter claimed.

What is claimed is:

1. A directional interpolation method which uses a region determination process to obtain a determination base for increasing resolution of an image, the image consisting of pixels arranged in rows and columns, the directional interpolation method adding a plurality of pixels to increase resolution of the image, any of the pixels added being located on a position in the image, the method comprising:

a texture analysis step, which performs a texture slope analysis to find a monotone variation area by taking the position as a center, the monotone variation area being a union of same-sized regions where pixels of an upper monotone variation area faces to pixels of a lower monotone variation area one-to-one, the upper monotone variation area being obtained by performing both a high-pass filtering on pixels centered in a closest upper row to the position and said region determination process on the pixels after being high-pass filtered, the lower monotone variation area being obtained by performing both the high-pass filtering on pixels centered in a closest lower row to the position and a region determination process on the pixels after being high-pass filtered, and the high-pass filtering performing an inner product on each pixel and its neighbor pixels in the same row with a high-pass matrix to thus obtain a scalar representing brightness change rate of the each pixel;

a texture variance consistence step, which seeks two pixels with texture variance consistence to find an effective region for interpolation of images and that computes all directional texture variances in the closest upper and the closest lower rows of pixels within the monotone variation area in the case of taking the position as a center and accordingly finds the two pixels having texture variance consistence; and an interpolation step, in which the interpolation step finds the value of pixel to be interpolated to the position by filtering in accordance with the two pixels found at the texture variance consistence step.

2. The method as claimed in claim 1, wherein the texture analysis step, the texture variance consistence step and the interpolation step are repeated until the pixels added are all interpolated to a respective position of the image.

3. The method as claimed in claim 1, wherein the high-pass matrix is a 2×6 matrix with [−1 −1 −2 2 1 1; −1 −1 −2 2 1 1].

4. The method as claimed in claim 3, wherein the region determination process comprises:

a classification step, which classifies the scalars into flat, bumpiness, mono left slope and mono right slope respectively representative of 0, 2, 1 and −1; and a region determination step, which takes the pixel in a row closet to and right above the position as the center to search toward left and right directions to find the monotone variation area having intervals with values of {0, 1}, {0, −1}, {1}, {0} or {−1}.

5. The method as claimed in claim 1, wherein
in the texture variance consistence step, the two pixels having texture variance consistence are two corresponding pixels having the least texture variance.

6. The method as claimed in claim 1, wherein the texture variance consistence step further comprises:
a texture direction determination step, which forms a line through a pair having one pixel in the upper monotone variation area and one pixel in the lower monotone variation area, the line passing through and centering on the position, direction of the line forming the texture direction, a plurality of pixels in the upper monotone variation area forming a plurality of texture directions;
a texture variance computation step, which applies a second function to one pixel in the upper monotone variation area and one pixel in the lower monotone variation area in a same texture direction for computing its texture variance; and
a selection step, which selects two pixels having the least texture variance at the texture variance compute step.

7. The method as claimed in claim 6, wherein the texture variance compute step further comprises:
a pixel horizontal extension step, which extends one of the pair in the upper monotone variation area to its left and right pixels at the same row to thus form a set of pixels, extends the other in the lower monotone variation area to its left and right pixels at the same row to thus form another set of pixels, and applies a second function to the two sets of pixels, thereby obtaining texture variance.

8. The method as claimed in claim 7, wherein the texture variance computation step further comprises:
a pixel vertical extension step, which upwardly shifts the two sets of pixels generated at the pixel horizontal extension step one row to thus obtain two different sets of pixels, downwardly shifts it one row to thus obtain another two different sets of pixels, and applies a second function to the six sets of pixels, thereby obtaining texture variance.

9. The method as claimed in claim 1, wherein the filtering at the interpolation step is a median filtering.

10. The method as claimed in claim 5, wherein the interpolation step further comprises:
a pixel horizontal extension step, which separately combines each of the two pixels found at the texture variance consistence step with its left pixel and right pixel at the same row, so as to form two sets of pixels; and
a pixel interpolation computation step, which applies the filtering to the two sets of pixels formed at the pixel horizontal extension step for median filtering computation in order to obtain a value of pixel to be interpolated to the position.

11. A directional interpolation device which uses a region determination process to obtain a determination base for increasing resolution of an image, the image consisting of pixels arranged in rows and columns, the directional interpolation method adding a plurality of pixels to increase resolution of the image, any of the pixels added being located on a position in the image, the device comprising:
an input terminal, which receives signals representing the pixels of the image;
a memory, which is connected to the input terminal in order to store the pixels of the image in row direction;
a texture analysis module, which is connected to the memory in order to perform a texture slope analysis for finding a monotone variation area by taking the position as a center, wherein the monotone variation area is a union of same-sized regions where pixels of an upper monotone variation area face pixels of a lower monotone variation area one-to-one, the upper monotone variation area is obtained by performing both a high-pass filtering on pixels centered in a closest upper row to the position and said region determination process on the pixels after being high-pass filtered, and the lower monotone variation area is obtained by performing both the high-pass filtering on pixels centered in a closest lower row to the position and a region determination process on the pixels after being high-pass filtered;
a texture variance consistence module, which is connected to the texture analysis module in order to seek two pixels with texture variance consistence to find an effective region for interpolation of images and that computes all directional texture variances in the closest upper and the closest lower rows of pixels within the monotone variation area in the case of taking the position as a center and accordingly finds the two pixels having texture variance consistence; and
an interpolation module, which is connected to the texture variance consistence module in order to find the value of pixel to be interpolated to the position through a median filter in accordance with the two pixels and their neighbor pixels.

* * * * *